US006143392A

United States Patent [19]

Hughes

[11] Patent Number: 6,143,392

[45] Date of Patent: Nov. 7, 2000

[54] DROP CLOTH CONSTRUCTION FOR RAILINGS AND BANNISTERS

[76] Inventor: John M. Hughes, 1128 Bardell Dr., Wilmington, Del. 19808

[21] Appl. No.: 09/251,673

[22] Filed: Feb. 17, 1999

[51] Int. Cl.$^{7}$ .................................................. B32B 3/06

[52] U.S. Cl. .............................. 428/100; 428/99; 118/505

[58] Field of Search ..................... 428/99, 100; 118/505; 150/154, 158

[56] References Cited

U.S. PATENT DOCUMENTS

| | | | |
|---|---|---|---|
| 4,263,355 | 4/1981 | Sarkisian | 428/124 |
| 4,627,363 | 12/1986 | Jones | 428/100 |
| 4,691,409 | 9/1987 | Torgerson et al. | 16/250 |
| 5,441,769 | 8/1995 | Ross | 427/282 |
| 5,658,632 | 8/1997 | Krabill | 428/43 |

*Primary Examiner*—Alexander S. Thomas
*Attorney, Agent, or Firm*—Henderson & Sturm LLP

[57] ABSTRACT

A drop cloth construction 10 for a structure having an elongated top cap 101 supported by a plurality of vertical supports 102 such as a bannister or railing 100. The construction 10 includes an elongated cover member 20 fabricated from a strip of protective material 22 such as plastic or treated canvas. The cover member 20 is operatively associated with a plurality of securing unit 12 disposed on the opposite ends and the intermediate portion of the cover member 20 for releasably engaging the cover member 20 with the top and opposite sides of the elongated top cap.

8 Claims, 1 Drawing Sheet

DROP CLOTH CONSTRUCTION FOR RAILINGS AND BANNISTERS

BACKGROUND OF THE INVENTION

1. Field of the Invention

The present invention relates to the field of masking devices in general, and in particular to a drop cloth construction that is specifically designed to cover railings and bannisters during painting.

2. Description of Related Art

As can be seen by reference to the following U.S. Pat. Nos. 4,263,355; 4,691,409; 5,441,769; and 5,658,632, the prior art is replete with myriad and diverse specialized paint masking devices used to cover certain interior surfaces during painting.

While all of the aforementioned prior art constructions are more than adequate for the basic purpose and function for which they have been specifically designed, they are uniformly deficient with respect to their failure to provide a simple, efficient, and practical construction for covering the tops and sides of railings and bannisters during painting.

As it stands right now, the common practice is to tape sheets of newspaper over the top and sides of railings and bannisters during painting to prevent paint drops and splatters from marring those surfaces. Unfortunately, this is a time consuming and messy task, not only during the masking installation phase, but also during the removal phase when the surface of the adhesive tape has a tendency to come into contact with and adhere to the finished surfaces of the railing or bannister.

Furthermore, the reason that most people have adopted the tedious newspaper approach is due to the simple fact that conventional drop cloths are too big and bulky for covering such a discrete area. Plus, they tend to become a hazard to workmen when they are used for this particular purpose, since they invariably obstruct stairs and walkways when installed over the railings and bannisters.

As a consequence of the foregoing situation, there has existed a longstanding need for a new and improved reusable drop coth construction that is specifically designed to be quickly and easily installed and removed from a railing and/or bannister, and the provision of such a construction is a stated objective of the present invention.

BRIEF SUMMARY OF THE INVENTION

Briefly stated, the drop cloth construction for railings and bannisters that forms the basis of the present invention comprises in general, a cover unit and a plurality of securing units. The cover unit is dimensioned to cover a substantial running length of a railing or bannister and the plurality of securing units are adapted to secure the cover unit at spaced locations along the railing or bannister.

As will be explained in greater detail further on in the specification, the cover construction is specifically designed to protect the top of a structure having an elongated top cap supported by a plurality of vertical supports such as a railing, bannister, or the like.

In addition, the cover unit comprises an elongated relatively thin narrow cover member fabricated from an elongated strip of protective material designed to keep paint splatters from landing on the top or sides of the top cap.

Furthermore, the plurality of securing units comprise a plurality of pairs of strap members disposed on the opposite ends and the intermediate portion of the cover member to releasably secure the cover member over a substantial portion of the running length of the top cap of the railing or bannister.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
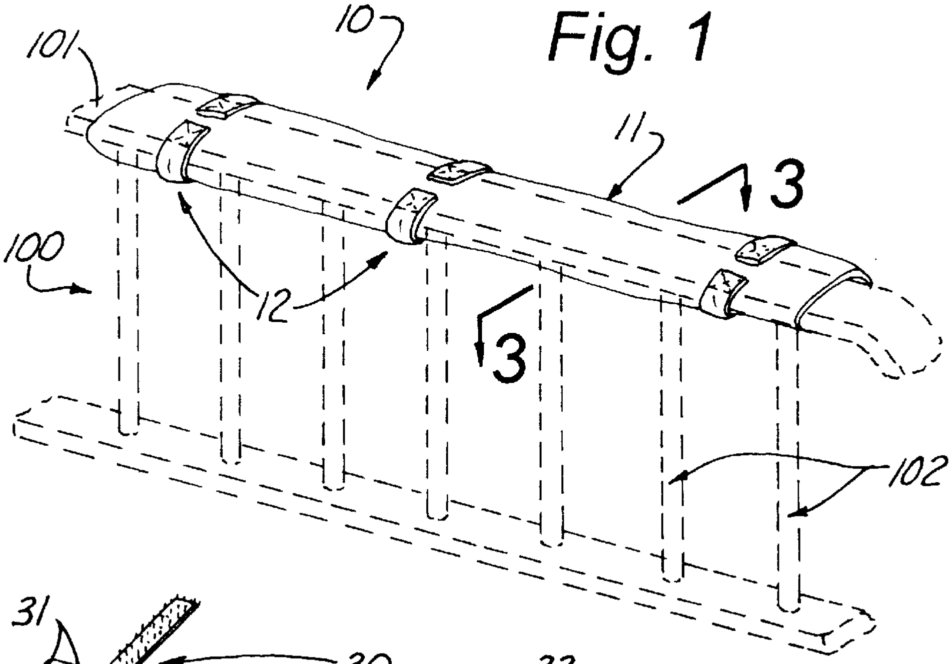
FIG. 1 is a perspective view of the drop cloth construction of this invention installed on a conventional railing or bannister.

As can be seen by reference to the drawings, and in particular to FIG. 1, the drop cloth construction for railings and bannisters that forms the basis of the present invention is designated generally by the reference number 10. The construction 10 comprises in general, a cover unit 11, and a plurality of securing units 12. These units will now be described in seriatim fashion.

Figure 2:
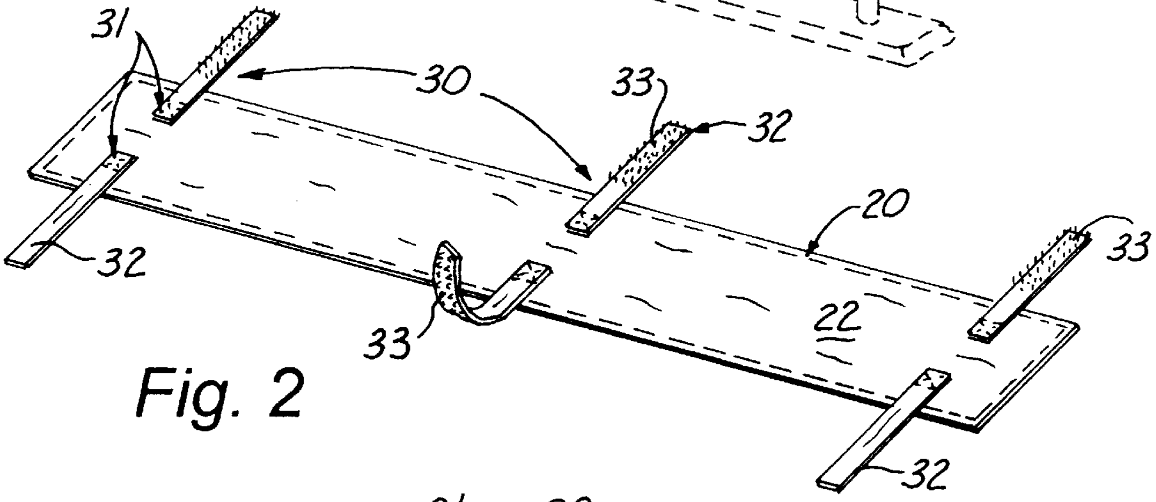
FIG. 2 is an isolated top perspective view of the drop cloth construction.

As can best be seen by reference to FIG. 2, the cover unit 11 comprises a cover member 20 fabricated from an elongated strip of protective material 22 such as thick plastic or canvas that has been treated with waterproofing and/or chemical resistant coatings to render the strip of material 22 impervious to the effects of any liquid that would be deposited on the upper surface of the strip of material 22 and which would further prevent the migration or penetration of the liquid through the strip of material.

In the preferred embodiment of the invention depicted in the drawings, the width of the strip of material 22 will normally range between eight to twelve inches and the length of the strip of material will range between six to fifteen feet.

These dimensions are chose so that the width of the strip of material 22 will cover the top and both sides of most conventional railings or bannisters designated generally as 100 and the length is chosen so that the minimum number of drop cloth constructions 10 can be used to cover the running length of most railings and bannisters 100.

Figure 3:
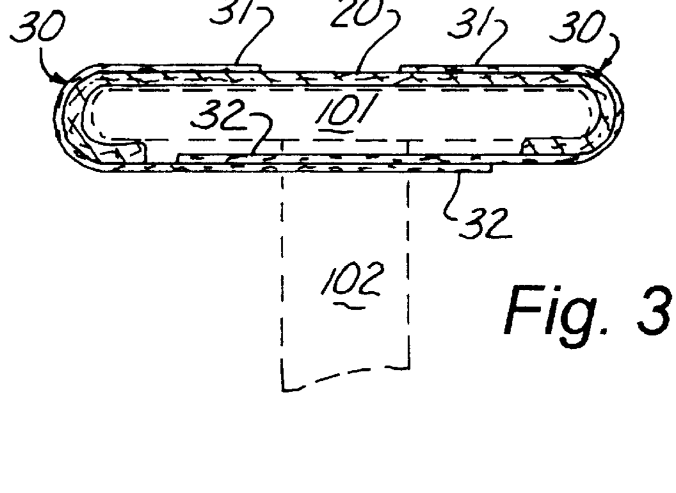
FIG. 3 is a cross sectional view taken through line 3—3 of FIG. 1.

As shown in FIGS. 1 and 3, conventional railings and bannisters 100 have an elongated top cap 101 that is supported by a plurality of vertical supports 102. The cover unit 11 of this invention is dimensioned to overlie and protect the top and sides of the top cap 101.

Furthermore, as shown in FIG. 2, each of the plurality of securing units 12 comprise a pair of strap members 30 having their inboard ends 31 affixed to opposite sides of the cover member 20 and having their outboard ends 32 provided with cooperating hook and loop fastening elements 33.

In addition, the plurality of securing units 12 comprise one securing unit 12 provided proximate each end of the cover unit 11 and at least one additional securing unit 12 disposed intermediate the ends of the cover unit 11 to maintain the cover unit 11 in place relative to the top cap 101 of the bannister or railing 100.

As can be appreciated by reference to FIGS. 1 and 3, the construction 10 is employed on a railing or bannister 100 by placing the elongated cover unit 11 over the running length of the top cap 101 of the railing or bannister 100 and then wrapping the pairs of strap members 30 beneath the to cap 101 at a point between the vertical supports 102 so that the cooperating hook and loop fasteners 33 can be engaged to secure the cover unit 11 in a captive surrounding relationship relative to the top and opposite sides of the top cap 101 of the railing or bannister 100.

In this manner, the drop cloth construction 10 can quickly and easily be installed on the railing or bannister prior to any painting being done to protect the railing or bannister during the painting and then be quickly and easily removed after the painting has been completed for reuse on another painting project.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A drop cloth construction in combination with a railing structure consisting of an elongated generally narrow top cap supported by a plurality of closely spaced aligned vertical supports having a running length that includes a horizontal section and an angled section wherein the construction comprises:

a cover unit including an elongated narrow rectangular cover member dimensioned to overlay the top and sides of at least a substantial portion of the running length of said elongated top cap; wherein the minimum length to width ratio of the elongated cover member is approximately 9:1; and a plurality of securing units operatively associated with the opposite ends and the intermediate portion of the elongated cover member wherein each of said plurality of securing units comprises a pair of strap members wherein each strap member has an inboard end affixed to the opposite sides of the cover member and a free end dimensioned to engage the free end of the other strap member in said pair of strap members.

2. The construction as in claim 1 wherein said cover member is fabricated from an elongated strip of protective material.

3. The construction as in claim 2 wherein said strip of protective material comprises plastic.

4. The construction as in claim 2 wherein said strip of protective material comprises canvas.

5. The construction as in claim 4 wherein the canvas is treated with a waterproofing coating.

6. The construction as in claim 5 wherein the canvas is further treated with a chemical resistant coating.

7. The construction as in claim 4 wherein the canvas is treated with a chemical resistant coating.

8. The construction as in claim 1 wherein the free end of said pair of strap members are provided with cooperating hook and loop fasteners.

* * * * *